(12) United States Patent
Mastio et al.

(10) Patent No.: US 9,988,289 B2
(45) Date of Patent: Jun. 5, 2018

(54) WATER TREATMENT PRODUCT AND METHOD

(71) Applicant: ZODIAC GROUP AUSTRALIA PTY LIMITED, Smithfield, New South Wales (AU)

(72) Inventors: Emmanuel Mastio, Frenchs Forest (AU); Craig Andrews, Mosman (AU); Bengu Bozkaya-Schrotter, Frenchs Forest (AU)

(73) Assignee: ZODICAC GROUP AUSTRALIA PTY LIMITED, New South Wales (AU)

( * ) Notice: Subject to any disclaimer, the term of this patent is extended or adjusted under 35 U.S.C. 154(b) by 445 days.

(21) Appl. No.: 14/450,329

(22) Filed: Aug. 4, 2014

(65) Prior Publication Data

US 2014/0339176 A1 Nov. 20, 2014

Related U.S. Application Data

(63) Continuation of application No. PCT/AU2013/000177, filed on Feb. 27, 2013.
(Continued)

(30) Foreign Application Priority Data

Feb. 27, 2012 (AU) ................ 2012900748

(51) Int. Cl.
*C02F 1/66* (2006.01)
*C02F 1/68* (2006.01)
(Continued)

(52) U.S. Cl.
CPC .............. *C02F 1/688* (2013.01); *C02F 1/685* (2013.01); *C02F 1/66* (2013.01); *C02F 1/76* (2013.01);
(Continued)

(58) Field of Classification Search
CPC .. C02F 1/66; C02F 1/685; C02F 1/688; C02F 1/76; C02F 2103/10; C02F 2103/42;
(Continued)

(56) References Cited

U.S. PATENT DOCUMENTS 5,137,731 A 8/1992 Casberg
6,852,238 B2 2/2005 Connelly, Jr.
(Continued)

FOREIGN PATENT DOCUMENTS

WO WO 0238506 A2 * 5/2002 ................ C02F 1/66
WO 2013126953 A1 9/2013

OTHER PUBLICATIONS

Fan et al. "Cellulose Hydrolysis: Chapter 4, Acid Hydrolysis of Cellulose" 1987, Springer-Verlag, pp. 121-146.*
(Continued)

*Primary Examiner* — Lucas Stelling
(74) *Attorney, Agent, or Firm* — Kilpatrick Townsend & Stockton LLP; Jennifer L. Blackburn

(57) ABSTRACT

A water treatment product and a method of water treatment are disclosed. The water treatment product comprises a layer and a water treating agent. The layer comprises a substance sensitive to a parameter directly or indirectly indicative of water quality of a body of water to which the layer is exposed. The layer deteriorates when the parameter indicative of water quality is poor. The water treating agent is thereby exposed to the body of water when the layer deteriorates, thereby improving the water quality.

19 Claims, 8 Drawing Sheets

Related U.S. Application Data

(60) Provisional application No. 61/604,686, filed on Feb. 29, 2012.

(51) Int. Cl.
*C02F 1/76* (2006.01)
*C09K 109/00* (2006.01)
*C02F 103/10* (2006.01)
*C02F 103/42* (2006.01)

(52) U.S. Cl.
CPC ...... *C02F 2103/10* (2013.01); *C02F 2103/42* (2013.01); *C02F 2209/00* (2013.01); *C02F 2209/06* (2013.01); *C02F 2209/29* (2013.01); *C09K 2109/00* (2013.01)

(58) Field of Classification Search
CPC .............. C02F 2209/00; C02F 2209/06; C02F 2209/29; C09K 2109/00
See application file for complete search history.

(56) References Cited

U.S. PATENT DOCUMENTS

| | | |
|---|---|---|
| 7,309,444 B2 | 12/2007 | Connelly, Jr. |
| 2004/0040915 A1 | 3/2004 | Connelly, Jr. |
| 2005/0040116 A1 | 2/2005 | Purdy et al. |
| 2006/0081810 A1 | 4/2006 | Blanchette et al. |
| 2009/0061082 A1* | 3/2009 | Swearingen ............ C02F 1/688 427/220 |

OTHER PUBLICATIONS

International Search Report dated Jul. 22, 2013 in Application No. PCT/AU2013/000177.
International-Type Search Report dated Apr. 10, 2012 in Application No. AU2012900748.

* cited by examiner

WATER TREATMENT PRODUCT AND METHOD

CROSS-REFERENCE TO RELATED APPLICATIONS

This application is a continuation of International Application No. PCT/AU2013/000177 filed on Feb. 27, 2013, published in English by the World Intellectual Property Organization on Sep. 6, 2013, as Publication No. WO 2013/126953 A1, which claims the benefit of Australian Patent Application No. 2012900748 filed on Feb. 27, 2012, and U.S. Provisional Application No. 61/604,686 filed on Feb. 29, 2012, the contents of all of which are incorporated herein by this reference.

TECHNICAL FIELD

A water treatment product for improving the water quality of a body of water is disclosed. A water treatment method is also disclosed. The water treatment product and method may be used in improving the water quality in a swimming pool, however, the disclosure is to be broadly interpreted, in that the water treatment product and method may also be used for improving the water quality of a pond, aquarium, spa, hot tub, or other body of water.

BACKGROUND ART

The treatment of water in pools, hot tubs, spas, aquariums and the like, is required to ensure that various qualities and parameters, such as chemical, physical and biological characteristics, are within given acceptable ranges. When a given chemical, physical and biological characteristic falls outside these acceptable ranges the water quality can be considered to be "poor". It is then necessary for the water to be treated. The water is treated to prevent someone, or something, becoming unwell from exposure. The water may additionally or alternatively be treated to prevent it from becoming imbalanced, etc, whereby the imbalanced water may otherwise cause degradation to the infrastructure, such as pipes and concrete, of the pool. The water can be treated in a number of ways, including chemical dosing, irradiation, filtration, etc.

To determine whether various chemical, physical and biological characteristics are within the acceptable ranges, it is generally necessary to perform tests on the water. The type of test required generally depends on the characteristic being tested. Testing, interpretation and correlation of the results can be quite complicated, and it is often necessary to have a professional analyse the results to determine the best procedure for treatment of the water to improve its quality.

One manner of testing water quality utilises so-called test strips. A test strip is placed in the water and removed after a pre-determined time. The test strip will usually have one or more sections, usually in the form of one or more indicator pads attached thereto, that are adapted to react to different characteristics of the water. Each indicator pad on the test strip measures a different characteristic of the water. For example, one indicator pad may test for pH and another indicator pad for total hardness. Each indicator pad will change colour after it has been submerged in the water for a predetermined time, depending on the levels of the characteristic in the water. The colours on the indicator pads are then compared with the colours on a reference chart to determine the levels of the characteristic in the water. It is then necessary to determine what the 'ideal' level of the characteristic should be, and the type of corrective action required to alter the levels of the characteristic in the water. For example, a test strip may have one indicator pad for testing pH. The pH indicator pad will change colour, when placed in the water. The extent of the colour change will be dependent on the pH of the water. The pad is compared with a reference chart to determine the pH. Once the current water pH is determined, it is then necessary for the user to determine whether the pH is higher or lower than the acceptable boundaries, the chemical that should be used to alter the pH in the appropriate direction (i.e. either increase or decrease the pH), and how much of the chemical should be dosed into the pool. This is quite a complicated procedure.

Due to the process of testing and then determination of the correct dosage, maintenance of a swimming pool can be quite difficult to upkeep. US 2006/0081810, U.S. Pat. No. 7,309,444 and U.S. Pat. No. 6,852,238 all disclose solid water treatment tablets for use in pools and spas, etc. Once the tablets are introduced to the pool or spa, they begin to dissolve and release the chemical at a specific rate. Some contain more than one chemical, and some control the rate of release of the chemical (i.e. the amount of time it takes for the chemical to finish being released).

The above references to the background art do not constitute an admission that the art forms a part of the common general knowledge of a person of ordinary skill in the art. The above references are also not intended to limit the application of the products and method as disclosed herein.

SUMMARY OF THE DISCLOSURE

According to a first aspect, a water treatment product is disclosed. The water treatment product comprises a layer and a water treating agent. The layer comprises a substance sensitive to a parameter indicative of water quality of a body of water to which the layer is exposed. The layer deteriorates when the parameter indicative of water quality is poor. The water treating agent is exposed to the body of water when the layer deteriorates, thereby improving the water quality. In this regard, the parameter indicative of water quality is considered to be "poor" when the parameter falls outside of an 'ideal' range. This 'ideal' range may simply be that the parameter is, or is not, present in the water, or it may be a numerical range that relates to concentration, etc. The water treating agent can treat the water, thus improving the water quality.

The water treatment product provides a simple means for treating water with a water treating agent, without the need to continually perform manual testing on the water to determine its quality. The water treatment product disclosed herein automatically releases the water treating agent into the water when the given parameter indicates that the water quality is poor, thus eliminating the manual testing process.

The layer of the water treatment product acts as a sensor to determine whether a parameter indicative of water quality is within certain acceptable boundaries (i.e. an 'ideal' range). If the parameter is within these acceptable boundaries, the layer remains intact and the body of water is not treated with the water treating agent. If the parameter is not within these acceptable boundaries, the layer, or part thereof, will deteriorate to expose a water treating agent which is suitable for improving the water's quality.

The parameter to which the layer is sensitive may be either directly or indirectly indicative of the quality of the body of water. When the parameter is directly indicative of the quality of the body of water, a water treating agent can be used that will directly alter or adjust the parameter of the water, thereby improving its quality. For example, the layer may be sensitive to the pH of the water, which is directly linked to the quality of the water. Similarly, a water treating agent can be exposed to the body of water which will directly alter the pH of the water. In this scenario, both the parameter to which the layer is sensitive and the water treating agent are directly related to the quality of the body of water.

On the other hand, when the parameter is indirectly indicative of the quality of the body of water, a water treating agent may be used that does not directly alter or adjust the parameter of the water, but nonetheless improves its quality. In this regard, the parameter to which the layer is sensitive may be considered to be related to the quality of the body of water, rather than indicative of the quality of the body of water. For example, the layer may be sensitive to ultraviolet light. In this example, the ultraviolet light is not a parameter inherently linked to the quality of water. However, the presence of ultraviolet light influences the quality of the water, in that the ultraviolet light destroys chlorine in the water. It is therefore necessary to either block the ultraviolet light, and prevent it from destroying the chlorine, or introduce more chlorine, to replace that which has been destroyed. In this regard, the parameter to which the layer is sensitive is not directly linked to the quality of water but, rather, can still influence the overall quality of the water. Similarly, even though the water treating agent may not directly alter the range or value of the parameter to which the layer is sensitive, the quality of the water may still be improved.

In an embodiment, for a specific parameter, different water treatment products, comprised of different layers and different water treating agents, may be located in the body of water at the same time so that divergent sensed results of the specific parameter can be treated. For example, the layer may be sensitive to pH, and the acceptable boundaries of pH for swimming pools is generally accepted to be within the range 7.2-7.8. The layer of a first water treatment product may therefore be sensitive to a pH of less than 7.1. When the pH of the water drops to 7.1, or below, the layer deteriorates to expose the water treating agent. In this example, the water treating agent would be an agent that increases the pH of water, such as sodium carbonate. Once the water treating agent is exposed to the water, water quality is improved by increasing the pH levels. Similarly, the layer of a second water treatment product may be sensitive to a pH of more than 7.9. When the pH of the water increases to 7.9, or above, the layer deteriorates to expose that water treating agent. In this example, the water treating agent would be an agent that decreases the pH of water, such as sodium bisulphate. Once the water treating agent is exposed to the water, water quality is improved by decreasing the pH levels. Both of the above exemplified water treatment products may be located in a body of water at the same time. However, only one water treating agent will become exposed to the water when its layer deteriorates due to the pH of the water being either higher or lower than the ideal range.

While the layer is described as 'deteriorating', it should be understood that this includes some or all of the layer crumbling, disintegrating, breaking apart, dissolving, eroding, reacting, effervescing, flaking, opening (e.g. membrane channels), swelling, or by other means that allows the water treating agent to be exposed to the body of water when the parameter sensed by the layer is poor. Furthermore, the layer need not be soluble in water when it deteriorates. For example, the layer may simply break apart to expose the water treating agent when the parameter to which the layer is sensitive is poor (i.e. when the parameter is outside of its accepted range). In such an example, the layer may remain in the water, or may be removed (e.g. by filtration means). Alternatively deterioration of the layer may be in the form of pores or gaps opening in the layer. For example, swelling may expand the microstructure of the layer such that gaps open between cross links in the layer, thereby deteriorating any barrier the layer provides. Furthermore, the layer need not encapsulate the water treating agent. In this regard, only part of the outer surface of the water treatment product may be formed by the layer. For example, the water treatment product may be formed of a non-soluble portion (e.g. a plastic tub with an opening) for holding the water treating agent, which is then sealed by the layer to contain the water treating agent therein.

The layer that responds to a parameter indicative of the quality of a body of water may additionally, upon deteriorating, have some other effect on the water quality not necessarily related to the parameter to which it is responding. For example, the layer may deteriorate in response to an elevated parameter and, upon doing so, may e.g. dissolve in the water and may, for example, have a clarifying effect on the water.

It should be noted that where the water treatment product has only one layer, only one parameter indicative of water quality is sensed. Consequently, appropriate corrective action is only taken with respect to the sensed parameter. Therefore, the water quality may only be improved in respect of the parameter sensed. Other parameters or characteristics of water quality may not have been improved, thus the overall quality of the water may still be poor.

The parameter indicative, either directly or indirectly, of water quality may include, but is not limited to: acidity; alkalinity; total alkalinity; biguanide; bromine; free bromine; chloride; chlorine; free chlorine; free and combined chlorine; conductivity; copper; cyanuric acid; hardness; calcium hardness; total hardness; hydrogen peroxide; iron; manganese; mineral/salt; monopersulfate; NaCl (salt); nitrate; oxidation reduction potential (ORP); ozone; pH; phosphate; quaternary ammonium compounds (QAC); turbidity; ultraviolet light; etc. Some of these parameters may have an 'ideal' range which indicates that the water quality of the body of water is good. When the parameters fall outside of this range, the water quality can be considered to be "poor". For some other of these parameters, the presence or absence of said parameter (i.e. that a parameter is, or is not, detectable) may indicate poor water quality. Furthermore, some of these parameters may be an indirect indicator of the water quality, or they may be parameters which can adversely affect water quality. Poor water quality is therefore relative to the parameter being indicated and, where one parameter indicated as being low (or absent) may be indicative of poor water quality, another parameter may be high (or present) to be indicative of poor water quality.

In this regard, the parameter indicative of water quality may be considered to be 'external' to the body of water itself. For example, UV light levels can affect the rate at which chlorine levels fall in a body of water. In this case, the UV light levels are not a property of the body of water itself, but they are indicative of a drop in chlorine levels and are thus still indicative of the quality of the body of water. In a further example, the presence of particular enzymes in a body of water may not be a property of the body of water itself, however the presence of these particular enzymes may indicate the presence of particular bacteria, which in turn may indicate low chlorine levels in the body of water. Therefore, the presence of such enzymes is a parameter that may be indicative of the quality of the body of water.

The water treating agent may include, but is not limited to: sodium bicarbonate; sodium carbonate; sodium bisulphate; sodium hypochlorite; chlorine; hydroxyethylidene diphosphonic acid complex; calcium chloride; hydrochloric acid; trichloroisocyanuric acid; sodium tetraborate pentahydrate; cyanuric acid; copper sulphate pentahydrate; boric acid; sodium dichloroisocyanurate dihydrate; calcium hypochlorite; potassium peroxymonopersulphate; aluminium sulphate; natural clarifier; cationic polyectrolyte; aluminium chlorhydrate; aluminium oxide; poly[oxyethylene(dimethyliminio)ethylene-(dimethyliminio)ethylene dichloride]; cupric ammonium complex; benzalkonium chloride; copper-triethanolamine complex (as copper); quaternary ammonium chloride; isocyanuric acid; sodium metabisulphite; 1-hydroxyethylidene-1,1-diphophonic acid; citric acid monohydrate; oxalic acid; magnesium sulphate heptahydrate; aluminosilicate; etc.

In applications outside of swimming pools, such as in mining applications, the water treating agent may comprise flocculants, settling agents, clumping or agglomeration agents, algaecides, etc each of which may improve the quality of the water into which they are released. For example, it may be necessary to treat cyanide in waste water, remove heavy metals, reduce the sulphate levels in the water, or perform nitrification or denitrification on the water.

Depending on the water treating agent and its layer, the water treating agent may be a liquid, solid, gel or gas, etc. The water treating agent may therefore be exposed to the body of water in any number of ways including, but not limited to: dissolving; water vapour; a fume released into the water; a liquid to mix with the body of water; etc. The water treating agent may be processed so as to increase or decrease the rate at which it is exposed to, or released into, the water. For example, the water treating agent may be a gel to allow an increased exposure/release rate, or it may be a compressed powder to decrease or slow the exposure/release rate. Different levels of compression may also be used to control the rate of exposure of the water treating agent. While gels and powders have been disclosed as two possible ways to control the exposure/release rate of the water treating agent, in addition to its controlled exposure dependent on the water parameter being sensed by the layer, it should be appreciated that the exposure rate of the water treating agent may also be controlled through the use of a binder or filler material. A binder or filler material may decrease the ability of the water treating agent from being exposed to the water, thus resulting in a release of the water treating agent over time.

The water treating agent may be integrated with or dispersed within the layer sensitive to a water quality parameter, such that the water treatment product comprises a single homogenous layer. Deterioration of this layer, due to sensitivity to a parameter, may release the water treating agent into the water. For example, the water treatment product may include a hydrogel sensitive to a particular parameter and having, for example, a solid form, whereby the water treating agent is homogeneously dispersed throughout the hydrogel.

The layer may include, but is not limited to: acidic group (e.g. —COOH, —SO$_3$H) pH sensitive materials; basic group (e.g. —NH$_2$) pH sensitive materials; biguanide sensitive materials; bromine sensitive materials; chloride sensitive materials; copper sensitive materials; cyanuric acid sensitive materials; calcium sensitive materials; hydrogen peroxide sensitive materials; iron sensitive materials; manganese sensitive materials; salt sensitive materials; monopersulfate sensitive materials; nitrate sensitive materials; ozone sensitive materials; phosphate sensitive materials; quaternary ammonium compounds (QAC) sensitive materials; ultraviolet light sensitive materials; temperature sensitive materials; materials sensitive to the ionic and/or solvent composition of the media; materials sensitive to the concentration of a specific chemical species; materials sensitive to an electric field; materials sensitive to photo irradiation; films; polymers; gels; etc. As an example, the following pH sensitive polymers or groups may be suitable for use as, or in, a pH sensitive layer: poly(4-vinylpyridine); poly(methacrylic acid); poly acrylic acid; sebacic acid; 4-vinylpyridine; acrylamido-methyl-propane sulfonate; glycidyl methacrylate acrylic acid; maleic anhydride; poly(methyl methacrylate); methacrylamide; poly(acrylonitrile-acrylic acid-N-vinylpyrrolidinone; diethyl maleate; dimethylaminoethyl methacrylate; poly(N-isopropylacrylamide-co-methacrylamide; polyethyleneglycol methacrylate; polyethylene naphthalate; carboxyl terminated poly(N-vinylcaprolactum); 4-(6-(acryloyloxy)hexyloxy) benzoic acid; polyacrylonitrile-acrylic acid co-polymer; poly(methyl methacrylate-acrylic acid-vinylpyrrolidone); or chitosan (poly-(D) glucosamine). Further, the layer may be substantially impermeable to water, or insoluble in water to prevent the premature exposure or release of the water treating agent.

In one embodiment, a protective layer may be arranged between the layer and water treating agent. Such a protective layer may serve to prevent a reaction occurring between the layer and the water treating agent. It may also prevent premature exposure of the water treating agent to the water, or protect the layer from prematurely deteriorating due to the water treating agent.

In one embodiment, the protective layer may be inert and/or water soluble. An inert protective layer prevents a reaction occurring between the layer and the water treating agent. Preferably, the protective layer is inert to both the layer and the water treating agent. A water soluble protective layer allows this layer to rapidly dissolve once the layer has deteriorated, thus allowing the water treating agent to be exposed to the water quickly, allowing the quality thereof to be promptly improved. In a preferred embodiment, the protective layer is inert to both the layer and water treating agent and is also water soluble.

The protective layer may include, but is not limited to: polyvinyl alcohol (also known as PVA or PVOH); acid functional resins; and biodegradable organic products, such as maize starch or gelatine.

In one embodiment, the water treatment product may comprise two or more water treating agents. In one embodiment, where one parameter may be indicative of related parameters, a single layer may be used to encapsulate multiple water treating agents. The layer may be sensitive to, for example, pH. The pH levels of the water may be used as an indicator of the alkalinity and pH of the water. The use of two different water treating agents may be required to treat the water and improve its quality. For example, it is possible to dose a pool having a low pH with both sodium carbonate and sodium bicarbonate to increase the pH and total alkalinity, respectively. The, or each, water treating agent may be processed in such a way as to delay, or prolong, its exposure to the water. It may be preferable, for example, to have a dose of water treating agent be exposed to the water over a period of time (e.g. over an hour), rather than in one instantaneous hit. Alternatively, it may be preferable, for example, to have the dose of water treating agent delayed from being exposed to the water by a certain period of time from when the layer and protective layer, where present, have deteriorated. In a water treatment product comprising two or more water treating agents, one or more of the water treating agent(s) may be delayed from exposure to the water to allow the other water treating agent(s) to treat the water first. In the example of a water treatment product having sodium carbonate and sodium bicarbonate encapsulated by a single pH sensitive layer, it may be preferable to expose/release the sodium carbonate first, to increase the pH, and delay or prolong the release of the sodium bicarbonate, to increase the total alkalinity.

In one embodiment, a boundary or protective layer may be provided between each different water treating agent. The boundary or protective layer, where the water treatment product comprises a protective layer arranged between the layer and the water treating agent, may be the same as the protective layer, or it may be different. This boundary helps to protect the different water treating agents from reacting with each other.

In one embodiment, each different water treating agent may have a different respective layer. In this regard, each different respective layer may be sensitive to a different respective parameter indicative of water quality, with a water treating agent suitable for treating said parameter located therein. The different respective layers only deteriorate when the parameter to which it is sensitive is indicative of poor water quality. Thus, a water treatment product comprising two different water treating agents, each with a different respective layer, may have one of the layers deteriorate exposing one of the water treating agents, while the other layer remains intact, thus preventing exposure of the other water treating agents.

In one embodiment, each different water treating agent may have a different respective protective layer arranged between it and the, or the different respective, layer(s). For example, in the embodiment where multiple water treating agents are provided in a single water treatment product with a single layer, each water treating agent may have its own protective layer. Similarly, where each water treating agent has a different respective layer, each water treating agent may have its own protective layer. Alternatively, where multiple water treating agents are provided in a single water treatment product, whether with a single layer, or different respective layers, there may only be one protective layer that surrounds the water treating agents from the layer(s).

In one embodiment, a plurality of layers may be dispersed between a plurality of regions of water treating agent. The water treating agents in the different regions may be the same or different. Similarly, the layers may be the same or different, depending on the type of water treating agent used. In this regard, the water treatment product may be in the form of a tablet, capsule, or ball, with regions of each water treating agent surrounded by a layer emanating from e.g. the centre of the tablet, capsule or ball. When the outer layer deteriorates, the outer region of water treating agent is exposed to the body of water. When the outer region of water treating agent has been released the next layer is exposed to the body of water, thus becoming the new 'outer' layer.

In an embodiment, where the water treatment product has the same water treating agents in the various regions and the same layers, and treatment of the parameter to which the layer is sensitive has just occurred, the next (e.g. next innermost) layer may or may not immediately deteriorate. The next layer may only begin to deteriorate once the quality of the water becomes poor again, thus again exposing the next layer of water treating agent to the body of water to improve the quality thereof.

The water treatment product may be any shape or form, however in one embodiment, the water treatment product may be in the form of a tablet, pellet, ball, granule, particle, capsule, lozenge, sachet, bag, or container, etc. Where the water treatment product is in the form of a sachet, bag or container, etc, the layer may form the sachet, bag or walls of the container and thus deteriorates when the given parameter is indicative of poor water quality. The sachet, bag or container may be formed from a gel, polymer, etc. As noted above, only part of the outer surface of the water treatment product may be formed by the layer. For example, the water treatment product may be formed of a non-soluble portion (e.g. a non-soluble polymeric tub with an opening) for holding the water treating agent, which is then sealed by the layer to contain the water treating agent therein.

When the water treatment product comprises two or more water treating agents, the water treating agents may form a segment, part, wedge, wafer, slab, shelf, disc, dome, groove, or notch, etc of the overall water treatment product.

In one embodiment, the water treating agent and/or the layer may further comprise a binding or filler material. The binding or filler material may be used to alter the exposure rate of the layer and/or water treating agent to the body of water. Additionally or alternatively, the binding or filler material may be used to increase the volume of the water treatment product to make it easier to manage. Where the water treatment product contains two or more different water treating agents, the binding or filler material may be used to produce a water treatment product of consistent dimensions, or to delay or prolong exposure of one or more of the water treating agent(s). For example, the volume of two different water treating agents in a single water treatment product may differ significantly. In such an instance, it may be necessary to add a filler material to the water treating agent of lesser volume to increase it so that it is of a similar volume to the other water treating agent, allowing a water treatment product of two consistently sized halves to be produced.

The binder or filler material may further comprise a dye that may be released into the water with the water treating agent(s) to indicate when the water treatment product has released the water treating agent(s) and requires replacement. Additionally, or alternatively, the binder or filler material may be selected based on its density. In this regard, the binder or filler material may be incorporated into either, or both, of the layer and water treating agent. This can allow the water treatment product to sink to the bottom of the body of water, float on the surface, or provide a neutral buoyancy so that the water treatment product will be surrounded by the water. Depending on the intended application, it may be preferable that once the water treating agent(s) is exposed to the body of water, remnants of the water treatment product, such as the layer, may float to the surface, or may sink to the bottom, etc.

According to a second aspect, a method of water treatment is disclosed. The method comprises locating a water treatment product in a body of water. The water treatment product comprises a water treating agent and a layer of a substance that is sensitive to a parameter indicative of water quality. The layer deteriorates when the parameter indicative of water quality is poor, thereby exposing the water treating agent to the body of water and improving the quality thereof. The parameter to which the layer is sensitive may be either directly or indirectly indicative of the quality of the body of water. When the parameter is directly indicative of the quality of the body of water, a water treating agent can be used that will directly alter or adjust that parameter of the water, thereby improving its quality. On the other hand, when the parameter is indirectly indicative of, or related to, the quality of the body of water, a water treating agent may be used that does not directly alter or adjust the parameter of the water, but nonetheless improves its quality.

In an embodiment, when the parameter indicative of water quality comprises an optimal range of values, and the water treatment product is used to treat the water when that parameter moves to a high side of that range, the method may further comprise locating a different water treatment product into the body of water. The different water treatment product may comprise a different water treating agent and a different layer substance that is sensitive to the same parameter, but sensitive to when the parameter moves to a low side of that range.

For example, the ideal pH for swimming pools is generally accepted to be within the range 7.2-7.8. However, it is possible that the pH may be higher or lower than this range, and different water treating agents are required to improve the water quality (i.e. to bring the pH back to within the acceptable range by either raising or lowering it). By locating two water treatment products in the body of water, one which lowers the pH and one which raises the pH, only one water treating agent will become exposed to the water when its layer deteriorates due to the pH of the water being either too high or too low.

In one embodiment, the method may further comprise locating a plurality of water treatment products for improving a plurality of parameters indicative of water quality into the body of water. This allows a number of parameters indicative of water quality to be potentially sensed and automatically treated at the same time, as the layer of each different water treatment product is sensing for a different parameter and potentially exposing a different water treating agent to the water to improve the quality of that parameter.

In one embodiment, the quantity of water treatment product located in the body of water is proportional to the volume of said body of water. For example, a 60,000 L body of water will require twice as much water treatment product as a 30,000 L body of water to improve the quality of the water. This may require, for example, two water treatment products to be placed into a 60,000 L body of water, or the water treatment may be suitably arranged to comprise sufficient water treating agent to dose a 60,000 L body of water. Therefore, different 'sized' water treatment products may be available for different bodies of water with different volumes.

The water treatment product of the second aspect may be otherwise as defined in the first aspect.

According to a third aspect, a water treatment product is disclosed. The water treatment product comprises a layer and a water treating agent that is surrounded by a protective layer. The layer comprises a substance sensitive to a parameter indicative of water quality of a body of water to which the layer is exposed. The layer deteriorates when the parameter indicative of water quality is poor. When the layer deteriorates, the protective layer deteriorates in the water, exposing the water treating agent to the body of water, thereby improving the water quality. Such a protective layer may serve to prevent premature exposure of the water treating agent to the water. Similarly, the protective layer may protect the layer from prematurely deteriorating due to the water treating agent (i.e. prevent a reaction between the layer and the water treating agent).

The water treatment product of the third aspect may be otherwise as defined in the first aspect.

The water treatment products disclosed in the first and third aspects may be introduced to the body of water via known dispensers or holders, such as in a floating dispenser that floats on the surface of the body of water. Locating the water treatment product in a body of water, as disclosed in the second aspect, may also be via known dispensers or holders, such as in a floating dispenser. Other dispensing systems, such as bags, tubs, cages, cartridges, multilayered filters, etc are also suitable for locating the water treatment product in the body of water.

Another dispensing system may comprise layers of water treating agent separated by layers sensitive to a parameter indicative of water quality, whereby each combination of water treating agent and layer can be considered a water treatment product. In this respect, a first water treatment product is exposed to the body of water. Upon deterioration of the exposed layer, the water treating agent of the first water treatment product is released into the body of water leaving the layer of a second water treatment product exposed to the body of water.

BRIEF DESCRIPTION OF THE DRAWINGS

Notwithstanding any other forms which may fall within the scope of the water treatment products and method as set forth in the Summary, specific embodiments will now be described, by way of example only, with reference to the accompanying drawings in which.

DETAILED DESCRIPTION OF SPECIFIC EMBODIMENTS

Figure 1A:
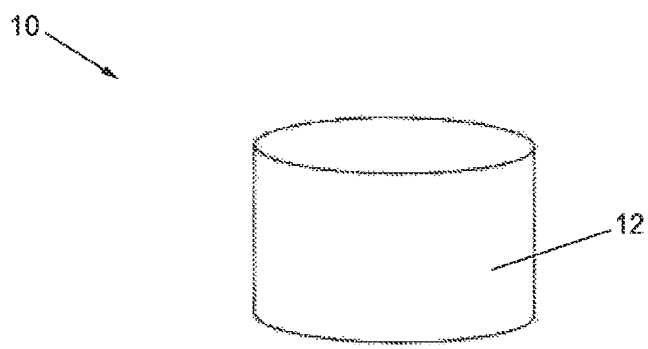
FIGS. 1A and 1B show perspective and cross-sectional views, respectively, of a first embodiment of a water treatment product.
Figure 1B:
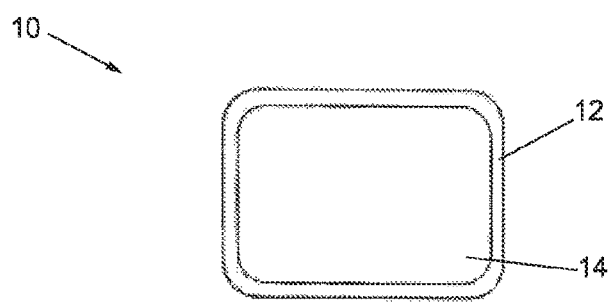

Referring firstly to FIGS. 1A and 1B, a first embodiment of a water treatment product for a domestic swimming pool is shown, in the form of a capsule 10. Capsule 10 is shown having a layer in the form of an outer coating layer 12 and an inner region of water treating agent 14. Coating layer 12 is sensitive to a parameter indicative of the water quality of a body of water such as, in this embodiment, a swimming pool. Where there is no intermediate layer (e.g. a protective layer, such as the one depicted in FIGS. 5 and 6) between coating layer 12 and water treating agent 14, there should be no interaction (e.g. chemical) between the coating layer 12 and water treating agent 14 that would either prevent release of, or prematurely release, the water treating agent 14 into the pool water.

Coating layer 12 may, for example, be sensitive to the pH of the water in the swimming pool. In this embodiment, the coating layer 12 is stable in the pool water when the pH is in the range of 7.2-7.8 (an optimal pH range for swimming pools). However, in this embodiment, the coating layer is sensitive when the pH is lower (i.e. when the pool water is more acidic) than the acceptable range of 7.2-7.8. When the pH of the water drops to, or below, 7.1, coating layer 12 begins to deteriorate, such as by erosion. The erosion of coating layer 12 exposes the water treating agent 14 to the pool water. In this embodiment, the water treating agent increases the pH of the water to bring the pH levels back to within the acceptable range, thus improving the water quality with respect to pH. One such suitable water treating agent may be sodium carbonate.

As there is no intermediate, or protective, layer between coating layer 12 and water treating agent 14, it is preferable that the water treating agent is, for example, pH neutral until it is exposed to water, at which point it becomes acidic. As the coating layer is sensitive to pH (i.e. the basicity of the water), having a water treating agent that is pH neutral prevents the water treating agent from prematurely triggering erosion of the coating layer.

However, as mentioned in the Summary, the coating layer 12 and water treating agent 14 can comprise a range of different water treating agents and be responsive to a range of parameters.

Figure 2A:
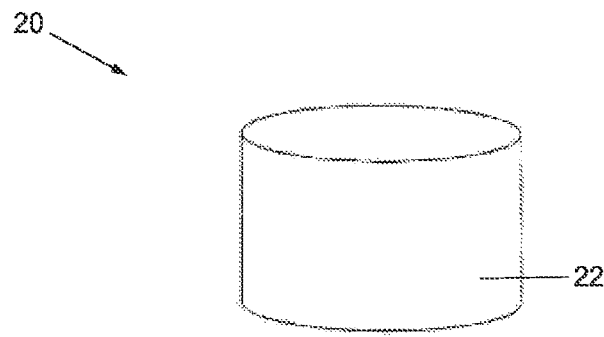
FIGS. 2A and 2B show perspective and cross-sectional views, respectively, of a second embodiment of a water treatment product.
Figure 2B:
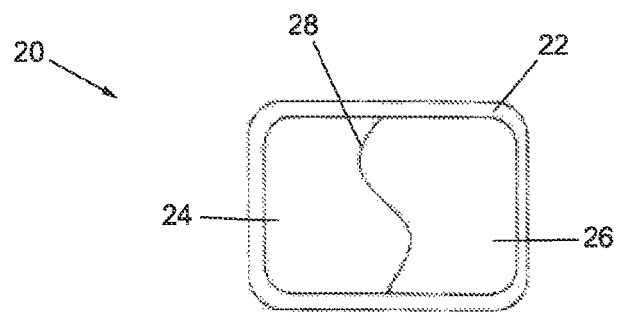

In this regard, and referring now to FIGS. 2A and 2B, a second embodiment of a water treatment product for a domestic swimming pool is shown, in the form of a lozenge 20. Lozenge 20 is shown having an outer layer 22 and an inner region, comprising two different water treating agents 24 and 26, separated by an inert boundary 28. In this embodiment, the two different water treating agents 24 and 26 may increase the pH and total alkalinity, respectively, of the pool water. Two such water treating agents may be sodium carbonate and sodium bicarbonate, respectively. As the necessity to use these two water treating agents can be determined by a single parameter (the pH of the water), a single coating layer 22, which is sensitive to and deteriorates in low pH conditions, is used. When the pH level of the pool water drops below 7.1, the coating layer 22 deteriorates, thus exposing the water treating agents 24, 26 to the pool water. The inert boundary layer 28 separates the two water treating agents 24, 26 whilst the lozenge is encapsulated by the single coating layer 22. As the water treating agents 24, 26 are exposed to the pool water, they dissolve into the water, as does the boundary layer 28. As the two water treating agents are exposed to the water, the pH and alkalinity levels increase, thus improving the water quality with respect to these parameters. While not shown, it is possible for one of the water treating agents (e.g. the sodium bicarbonate) to be processed so that its release is delayed. This may be by the inclusion of a binder or filler material, or the sodium bicarbonate may be more compressed making it harder to break up or dissolve. This allows the sodium carbonate to be exposed to the water before the water is also dosed with sodium bicarbonate.

Figure 3A:
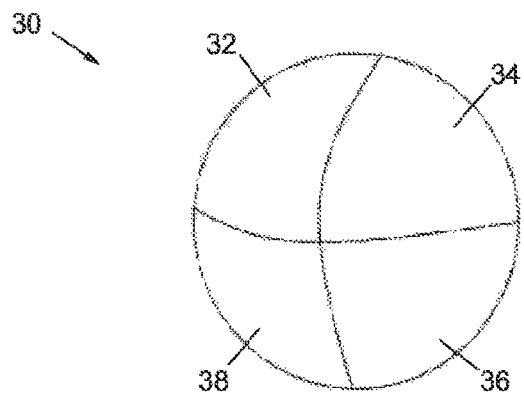
FIGS. 3A and 3B show perspective and cross-sectional views, respectively, of a third embodiment of a water treatment product.
Figure 3B:
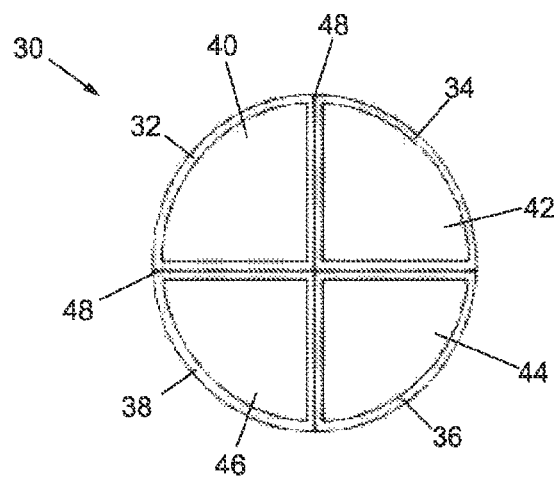

Referring now to FIGS. 3A and 3B, a third embodiment of a water treating product for a domestic swimming pool is shown, in the form of a ball 30. Ball 30 is shown having four segments which form the ball 30, each segment having a different outer layer 32, 34, 36, 38 and a different water treating agent 40, 42, 44, 46. An inert boundary layer 48 separates each of the outer layers 32, 34, 36, 38. In this ball 30, the outer layers 32, 34, 36, 38 surround the respective water treating agents 40, 42, 44, 46 into the segments of the sphere, so that the deterioration of one layer (e.g. layer 32) does not automatically expose the other water treating agents (e.g. 42, 44, 46). The outer layers may respectively be sensitive to pH, free chlorine, total hardness and total alkalinity.

As each water treating agent 40, 42, 44, 46, such as sodium bisulphate, chlorine, hydroxyethylidene diphosphonic acid complex and sodium bicarbonate, is used to treat a different parameter characteristic of water quality, each water treating agent 40, 42, 44, 46 is only exposed to the pool water when its respective outer layer 32, 34, 36, 38 deteriorates (i.e. when the respective parameter falls outside its acceptable range). If only the total alkalinity levels in the swimming pool are low, only coating 38 will deteriorate, thus exposing the sodium bicarbonate to increase the total alkalinity levels in the pool. Thus, the other three outer layers 32, 34, 36 would remain intact, as would their respective segments, until their respective parameters of pH, free chlorine and total hardness fall outside their acceptable ranges, causing the respective layers to deteriorate.

Rather than each respective segment being directed to the sensing and treatment of a different parameter indicative of water quality, two segments may be directed to the treatment of one parameter, with one segment sensing and treating the parameter when it exceeds the accepted range, and the other segment sensing and treating the parameter when it is lower than the accepted range. For example, two segments of ball 30 may be directed to the sensing and treating of pH—one when the pH levels in the water are too low (e.g. 32/40), and one when the pH levels in the water are too high (e.g. 34/42). Similarly, the other two segments may be directed to the sensing and treating of free chlorine levels—one when the free chlorine levels in the water are too low (e.g. 36/44), and one when the free chlorine levels are too high (38/46).

Figure 4A:
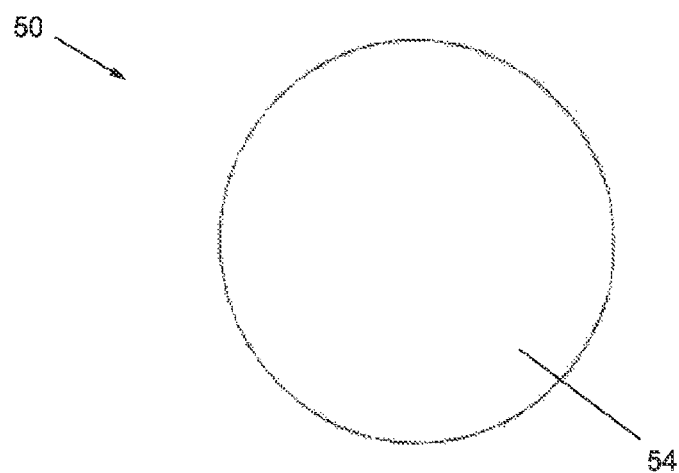
FIGS. 4A and 4B show perspective and cross-sectional views, respectively, of a fourth embodiment of a water treatment product.
Figure 4B:
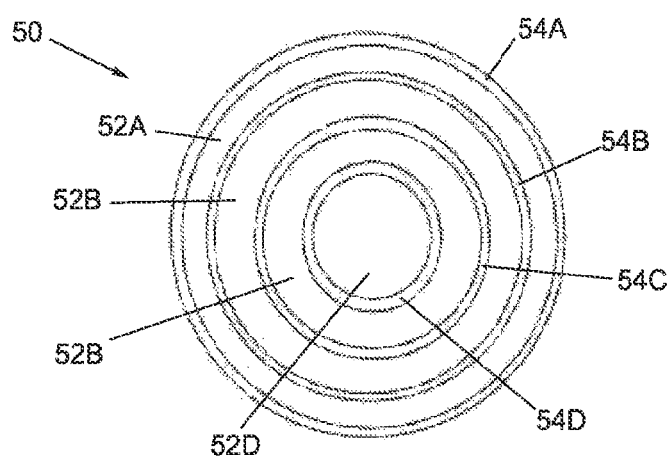

Referring now to FIGS. 4A and 4B, a fourth embodiment of a water treatment product is shown, in the form of a spherical tablet 50. Tablet 50 contains four regions of water treating agent 52 and four respective layers 54. In this embodiment, each region of water treating agent 52 contains the same water treating agent, and each respective layer 54 is the same material. This allows spherical tablet 50 to be placed into a domestic swimming pool and multiple doses of water treating agent to be dispensed into the water. For example, as the spherical tablet 50 is in the water, the outer layer 54A only deteriorates or dissolves when the parameter to which it is sensitive (e.g. pH) falls outside the accepted range. This then exposes the outermost water treating agent 52A to the water. As the water treating agent is altering the pH levels, the next layer 54B will not immediately dissolve, as the water surrounding layer 54B will have a, for example, higher pH due to the release of the water treating agent 52A. Thus, layer 54B will not dissolve until the overall water characteristics, and thus pH of the pool, again fall outside the ideal range. This will continue, with layer 54B dissolving to expose water treating agent 52B, and so on until the final water treating agent 52D is exposed after the dissolution of layer 54D.

While spherical tablet 50 is shown having four layers of water treating agent 52D, 52C, 52B and 52A, each surrounded by a respective layer 54D, 54C, 54B, 54A, and as would be appreciated by a person of ordinary skill in the art, the tablet may contain more, or fewer, than four layers. For example, a tablet having six layers of water treating agent, with each surrounded by a respective layer, may be used, or only two layers of water treating agent with respective layers may be used.

Figure 5A:
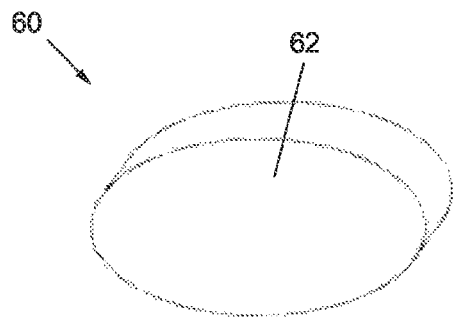
FIGS. 5A and 5B show perspective and cross-sectional views, respectively, of a fifth embodiment of a water treatment product.
Figure 5B:
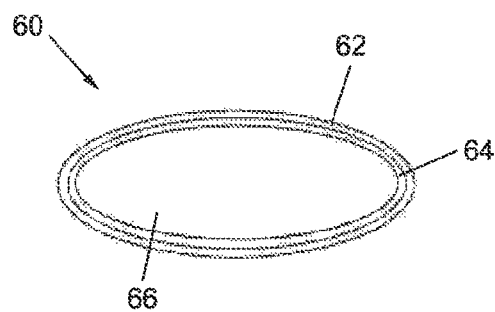

Referring now to FIG. 5, a fifth embodiment of a water treatment product is shown, in the form of a capsule 60. Capsule 60 is shown having an outer layer 62, a protective layer 64 and an inner region of water treating agent 66. Layer 62 is sensitive to a parameter indicative of the water quality of a body of water such as, in this embodiment, a swimming pool. Layer 62 may, for example, be sensitive to the pH of the water of the swimming pool. As in previous embodiments, the layer 62 is stable in the pool water when the pH is in the range of 7.2-7.8 (an optimal pH range for swimming pools). However, in this embodiment, the coating layer 62 is sensitive when the pH is lower (i.e. when the pool water is more acidic) than the acceptable range of 7.2-7.8. When the pH of the water drops below 7.2, layer 62 begins to deteriorate. The erosion of layer 62 exposes the protective layer 64 to the pool water. In this embodiment, protective layer 64 is soluble in water. Thus, when protective layer 64 is exposed to the water, due to the deterioration of coating layer 62, the protective layer 64 dissolves, exposing the water treating agent 66 to the pool water. In this embodiment, the water treating agent 66 is sodium carbonate, which increases the pH of the water to bring the pH levels back to within the acceptable range, thus improving the water quality with respect to pH.

Figure 6A:
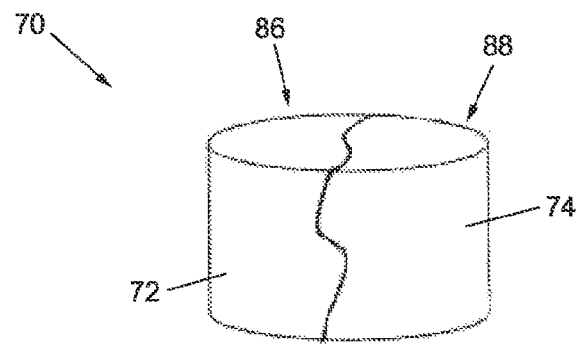
FIGS. 6A and 6B show perspective and cross-sectional views, respectively, of a sixth embodiment of a water treatment product.
Figure 6B:
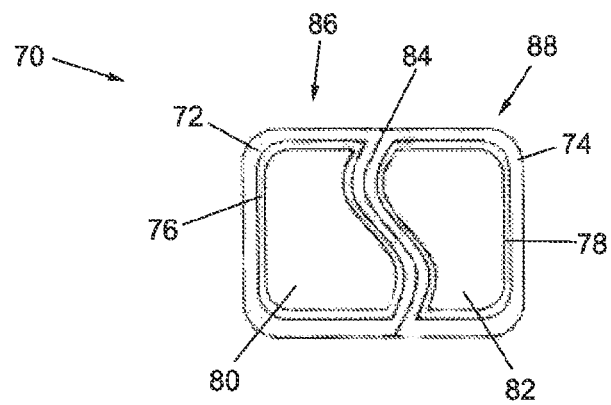

A sixth embodiment of a water treatment product for a domestic swimming pool is shown in FIGS. 6A and 6B, in the form of a lozenge 70. Lozenge 70 is shown having an outer coating comprised of two different outer layers 72, 74, a protective layer comprising two different protective compositions 76, 78, and an inner region comprising two different water treating agents 80, 82. The two different outer layers, protective compositions and water treating agents are separated by an inert boundary/binding portion 84, thus forming two segments 86, 88 in the lozenge 70. Each respective segment 86, 88 senses and treats the same parameter indicative of water quality, with one segment 86 sensing and treating the parameter when it exceeds the accepted ranges, and the other segment 88 sensing and treating the parameter when it is lower than the accepted ranges. In this embodiment, for example, segment 86 senses and treats the water when pH levels are low (i.e. lower than 7.2) and segment 88 senses and treats the water when pH levels are high (i.e. higher than 7.8). In this embodiment, the two different water treating agents 80 and 82 may be sodium carbonate and sodium bisulphate which, respectively, increase and lower the pH levels of the pool water. Similarly the outer layers 72, 74, are respectively sensitive to low (i.e. lower than 7.2) and high (i.e. higher than 7.8) pH levels in water. The respective protective compositions 76, 78 ensure the water treating agents 80, 82 are not prematurely exposed to the water, and that the water treating agents do not interfere with the sensitivity of the coating layers 72, 74. The inert boundary/binding portion 84 separates the two segments 86, 88, whilst keeping them together so they can be easily introduced into a swimming pool.

Figure 7A:
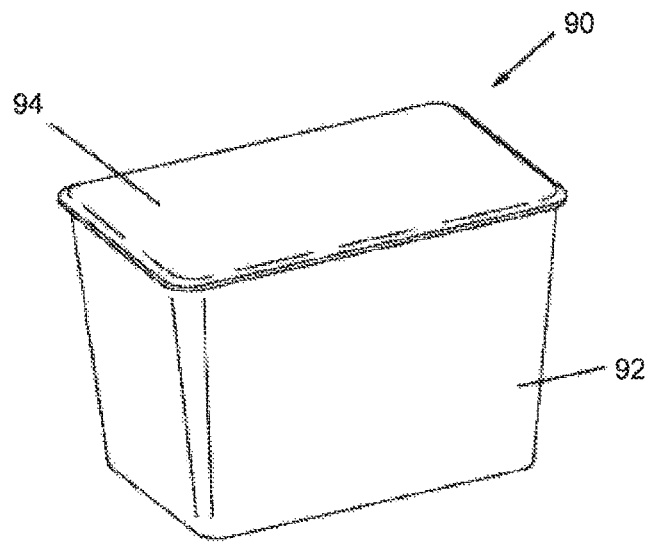
FIGS. 7A and 7B show perspective and cross-sectional views, respectively, of a seventh embodiment of a water treatment product.
Figure 7B:
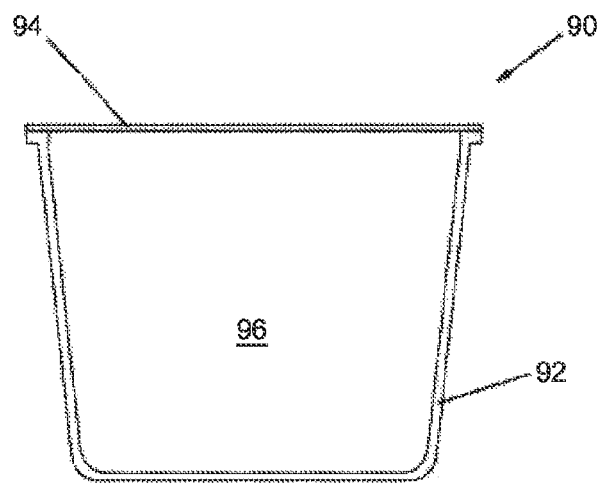

Referring now to FIGS. 7A and 7B, a seventh embodiment of a water treatment product is shown, in the form of a container 90. Container 90 is shown having a non-soluble portion, in the form of tub 92, a layer 94, and an inner region of water treating agent 96. The tub 92 may be formed of a polymeric material that, in addition to being non-soluble, is also inert to the water treating agent 96. Layer 94 is sensitive to a parameter that is indirectly indicative of the water quality of a body of water such as, in this embodiment, a swimming pool, such as ultraviolet light. The layer 94 may therefore be formed of a photodeformable polymer. In this embodiment, the water treating agent 96 should act to counter any effects of ultraviolet light on the water. A suitable water treating agent may therefore be cyanuric acid, which can block the effects of ultraviolet light degrading chlorine in the water, or chlorine, to replace chlorine which has been degraded by the ultraviolet light. When ultraviolet light is present, layer 94 may deteriorate, such as by deformation of the photodeformable polymer, thereby exposing the water treating agent 96 to the water. In this embodiment, neither the layer 94 nor the tub 92 dissolve in the water, and they may be collected in the pool's filtration system, or removed manually.

Figure 8A:
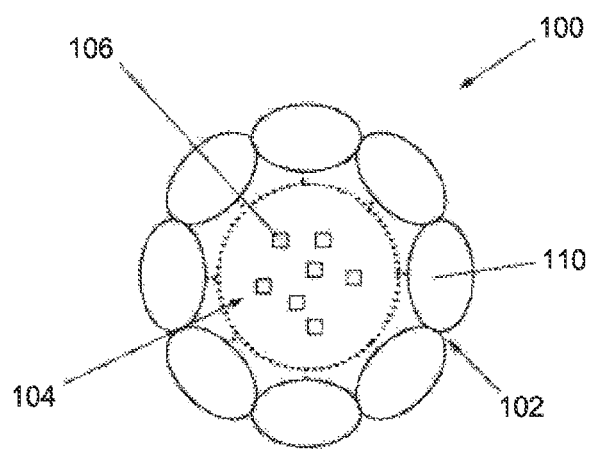
FIGS. 8A and 8B show cross-sectional views of an eighth embodiment of a water treatment product.
Figure 8B:
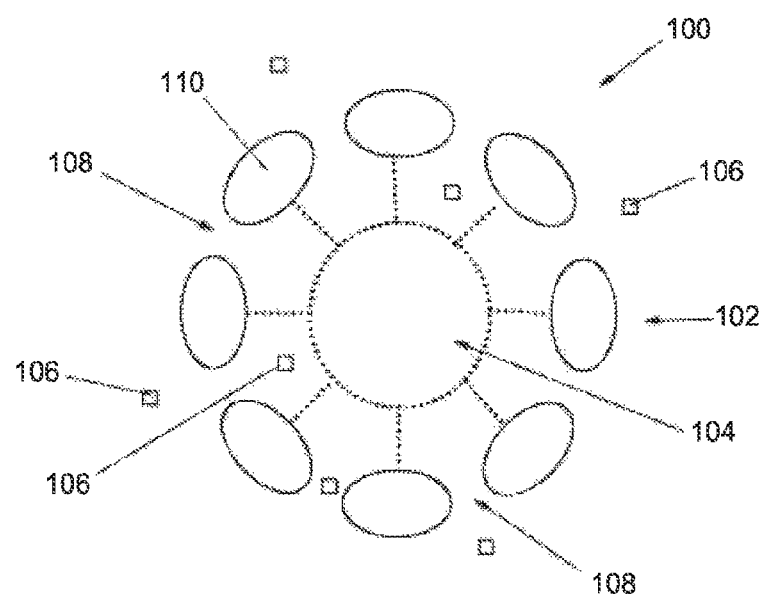

An eighth embodiment of a water treatment product, in the form of a cell 100, is shown in FIGS. 8A and 8B. Cell 100 includes a layer 102, which is sensitive to a parameter indicative of the quality of the body of water, and an inner region 104 which contains a water treating agent 106. In this embodiment, layer 102 is sensitive to basic (i.e. high pH) conditions of the water. A suitable water treating agent, to reduce the pH of the water, would therefore be sodium bisulphate. Unlike some previous embodiments, layer 102 does not dissolve when the pH is above 7.8. Rather, the structure of the cell 100 expands or swells, as best shown in FIG. 8B, whereby gaps, or pores, 108 are formed between cross-linkages of shells 110, which form the layer 102. When the cell 100 swells, the water treating agent 106 can pass through layer 102, to treat the water. As in the seventh embodiment, the cell 100 does not dissolve once the water treating agent 106 has been released into the water.

Similarly, other water treating agents and respective layers may be used. For example, the layer may be sensitive to chlorine, calcium hardness, or any other parameter indicative, either directly or indirectly, of the quality of the pool water, and a water treating agent corresponding to the rectification of the parameter being sensed by the layer may be used.

Non-limiting Examples of various water treatment products and methods, in use, will now be described to illustrate how the water treatment products and methods may be applied, for example, to improve the water quality of a domestic swimming pool. It should, however, be appreciated that the water treatment products and methods can be used to improve the water quality of other bodies of water such as spas, ponds, aquariums, hot tubs, waste water, industrial waste water, boiler and cooling tower water, etc. Furthermore, the parameters indicative of water quality, and their accepted or ideal range, may differ dependent on the body of water. For example, the accepted pH range for swimming pool or spa water may be different to that of cooling tower water.

It should also be appreciated that the materials in these examples may be used in combination with a protective layer (see FIG. 5B) of, for example, polyvinyl alcohol (PVOH, otherwise known as PVA). PVOH is soluble in water, and may be partially or fully hydrolysed to provide a protective layer that may be inert to various water treating agents. Data shows that PVOH may also be suitable for being coated by parameter sensitive materials, such as those discussed in the Examples below.

In Examples 1 to 4, investigations were made into determining a material suitable for an external layer sensitive to a pH range. The preferred pH range for pool water is approximately 7.2 to 7.8. Therefore investigations were made into materials that are sensitive to a pH levels above and below this range. The desired response is one that allows the layer to release a water treating agent, that can alter the pH, into the water. Such a material is required to be sensitive to a specific pH range, while also being non-reactive to water and any chemical that may be contained by the layer (be that an intermediary protective layer, or the water treating agent). Specifically, Examples 1 to 3 are directed to materials which are sensitive to pH levels below a particular threshold, whilst Example 4 is directed to investigating a material sensitive to pH levels above a particular threshold.

EXAMPLE 1

Investigations revealed that Poly(L-histidine)-b-poly(ethylene glycol) ("PolyHis-b-PEG") responds to pH levels below approximately 7.2. In particular, experimental data showed that at pH levels below approximately pH 7.2 PolyHis-b-PEG swelled, such that gaps formed between cross-links in the material structure. It was noted that once the material swelled due to a drop in pH, any increase of the pH level back to a pH of 7.2 resulted in contraction of the material and closing of the gaps in the structure. It was further noted that the swelling, and therefore deterioration, of the layer of PolyHis-b-PEG allowed other material to pass through the layer. A water treating agent that increases pH can therefore be released when the structure of the material has swelled.

EXAMPLE 2

Further investigations revealed that blended polymers of PolyHis-b-PEG-folate and poly(L-lactic acid) (PLLA)-b-PEG-folate also showed responses at lower pH levels. Experimental data showed that these blended polymers responded to pH levels between 7.2 and 6.6. As in Example 1, a decrease in pH to below 7.2, and down to about 6.6, caused the material to swell. It was noted that, similarly to PolyHis-b-PEG, swelling of the material, caused gaps to form between cross-links in the structure. It was further noted that such a response allowed material to pass through these blended polymers at the specified pH range, allowing a water treating agent capable of increasing the pH of the water to be released thereinto.

EXAMPLE 3

Investigations were also made into materials that deteriorate through means other than by swelling. The material chitosan, a linear polysaccharide, was investigated because it was noted that, when chitosan dissolved in pool water, it additionally acted as a clarifier.

The investigations revealed that chitosan was soluble in water at pH levels below pH 6. However, experimental data also revealed that the pH level for the solubility of chitosan was able to be further adjusted, through a mixture of chemical and physical approaches, so that a solubility threshold of about pH 7.1 was obtainable.

Therefore a chemically and/or physically modified chitosan was noted to be a suitable material for the layer, whilst also providing a secondary function of clarifying the water when dissolved therein.

EXAMPLE 4

Investigations were made into suitable materials for a layer that may deteriorate at high pH levels (i.e. above about 7.8), and thereby release, for example, an acid into the water to reduce these pH levels. Experimental data shows that superporous hydrogels have been tailored to swell under certain basic pH conditions. It was thus noted that superporous hydrogels were therefore suitable for containing and delivering a water treating agent for increasing pH levels of water.

Investigations were also made into materials suitable to form the layer that may respond to parameters other than pH level. In Example 5 investigations were made into materials that are responsive to the application of ultraviolet (UV) light. UV light levels, for example, can be related to the rate at which chlorine levels drop in e.g. a swimming pool. In Example 6 investigations were made into materials that are responsive to the presence of certain enzymes produced by bacteria which are commonly found in water which has not been appropriately treated. Examples 7 to 14 provide an indication of further envisioned usages.

EXAMPLE 5

Investigations were made into materials suitable for the layer that may respond to UV light. These investigations revealed that a number of photo-deformable polymers, including polymers such as monolayers, polymer gels, solid films, liquid-crystalline elastomers and photo-crosslinked polymers (also known as shape-memory polymers), are responsive to irradiation by ultraviolet light. It was thus noted that the deformation of such polymers could allow a water treating agent, such as cyanuric acid or chlorine, to be released therefrom, to counter the effects of the ultraviolet light on the water.

EXAMPLE 6

Low chlorine levels in a body of water, such as a swimming pool, can allow certain types of bacteria to grow, which in turn release enzymes into the water. Investigations were therefore made into materials that deteriorate in the presence of these enzymes.

One investigation revealed that the polyester poly(trimethylene) succinate can be degraded by the enzyme lipase. It was noted that lipases were produced by a wide range of bacteria commonly found in water having low chlorine levels, including for example, achromobacter, which can survive and multiply in untreated pool water. A high concentration of lipase in the water may be indicative of low chlorine levels. It was noted that because poly(trimethylene) succinate may degrade in the presence of lipase, it could be used for the layer in a water treatment product containing chlorine.

Investigations into other enzyme sensitive materials, relating to bacteria commonly found in water, are ongoing.

EXAMPLE 7

A handful of approximately eight capsules, 10, such as the one described in relation to FIG. 1, were put into a swimming pool. The capsules 10 generally circulated in the water or sunk to the bottom of the pool. Periodically, for the purposes of comparison in this example, the pH of the pool water was manually tested. It was determined that the pH levels were initially within the accepted ranges of 7.2-7.8.

Capsule 10 comprised a coating layer 12 that eroded when the pH of the pool water dropped below 7.2, to expose a water treating agent 14, sodium carbonate.

It was noted that when the pH dropped to 7.1, one of the capsules 10 dissolved into the water, and the pH again returned to within the accepted range of 7.2-7.8. While the pH remained within the accepted range, the remaining capsules 10 remained intact in the swimming pool. It was observed that if the pH again dropped below 7.2, another capsule would dissolve.

EXAMPLE 8

Two lozenges 20, such as the one described in relation to FIG. 2, were put into a swimming pool. The lozenges 20 generally circulated in the water. Periodically, for the purposes of comparison in this example, the pH and total alkalinity of the pool water was manually tested. It was determined that the pH levels were initially within the accepted range of 7.2-7.8, as were the alkalinity levels (accepted range of 60-200 mg/L). It is noted, however, that pH levels may also be used as an indicator of total alkalinity, and that a drop in total alkalinity also results in a drop in the pH level.

It was noted that when the pH dropped to 7.1, one of the lozenges 20 dissolved into the water, and the pH again returned to within the accepted range of 7.2-7.8. While the pH remained within the accepted ranges, the remaining lozenge 20 remained intact in the swimming pool. It was observed that when the pH again dropped below 7.2, the other lozenge 20 dissolved.

Lozenge 20 comprised a coating layer 22 that crumbled, and eventually dispersed into the pool filtration system, when the pH of the pool water dropped below 7.2, to expose two water treating agents 24 and 26. These two water treating agents 24, 26 were sodium carbonate and sodium bicarbonate which, respectively, increased the pH and total alkalinity of the pool water. The increase of the pH and total alkalinity resulted in an improvement of the pH levels in the water (i.e. to within its accepted ranges of 7.2-7.8), and thus the improvement of the quality of the water in respect of this specific parameter. The inert boundary 28 that separated the two water treating agents 24, 26 solubilised when it, too, was exposed to water.

EXAMPLE 9

Five balls 30, such as the one described in relation to FIG. 3, were put into a swimming pool of 50,000 L—one ball for each 10,000 L of water in the pool. The balls 30 generally circulated in the water or sunk to the bottom of the pool. Periodically, for the purposes of comparison in this example, the pH, free chlorine, total hardness and total alkalinity levels of the pool water were manually tested. It was determined that the pH levels were initially within the accepted 'ideal' range of 7.2-7.8. It was also determined that the free chlorine levels were within the accepted 'ideal' range of 1.0-3.0 mg/L, total hardness levels were within the accepted 'ideal' range of 250-500 mg/L and the total alkalinity levels were within the accepted 'ideal' range of 80-120 ppm.

An inert boundary layer 48 separated each of the coating layers 32, 34, 36, 38, and also assisted in binding the coating layers/segments into the ball 30. In these balls 30, the coating layers 32, 34, 36, 38 surrounded the respective water treating agents 40, 42, 44, 46 into the segments of the sphere, so that the erosion of one coating layer (e.g. layer 32) did not automatically expose the other water treating agents (e.g. 42, 44, 46). The coating layers 32, 34, 36, 38 were respectively sensitive to pH, free chlorine, total hardness and total alkalinity.

It was noted that when the pH decreased below 7.2, one segment (32/40) of the balls 30 dissolved into the water, and the pH again returned to within the ideal range of 7.2-7.8. The segment 32/40 that dissolved comprised a pH sensitive coating and sodium carbonate, which increased the pH levels when it was exposed to the water. As pH was the only parameter that was outside its accepted range, the remaining segments (34/42; 36/44; 38/46) of the balls 30 remained intact in the swimming pool.

When the total alkalinity levels decreased below 80 ppm in the swimming pool, coating 38 eroded, thus exposing the sodium bicarbonate which increased the total alkalinity level back to within the accepted range. Thus, the other two coating layers 34, 36 remained intact, as did their respective segments (34/42; 36/44), until the respective parameters of free chlorine and total hardness fell outside the acceptable ranges, causing the coating layers to erode.

EXAMPLE 10

Five balls 30, such as the one described in relation to FIG. 3, were put into a swimming pool of 50,000 L—one ball for each 10,000 L of water in the pool. The balls 30 generally circulated in the water or sunk to the bottom of the pool. Periodically, for the purposes of comparison in this example, the pH and free chlorine levels of the pool water were manually tested. It was determined that both the pH and free chlorine levels were initially within the accepted ranges of 7.2-7.8 and 1.0-3.0 mg/L, respectively.

Ball 30 had four segments (32/40; 34/42; 36/44; 38/46) which formed the ball. Each segment had a different coating layer 32, 34, 36, 38 and a different water treating agent 40, 42, 44, 46. An inert boundary layer 48 separated each of the coating layers 32, 34, 36, 38. The coating layers 32, 34, 36, 38 surrounded the respective water treating agents 40, 42, 44, 46 into the segments of a sphere, so that the erosion of one coating layer (e.g. layer 32) did not automatically expose the other water treating agents (e.g. 42, 44, 46). Two of the coating layers 32, 34 were sensitive to pH and the other two coating layers 36, 38 were sensitive to free chlorine. Of the pH sensitive coating layers, one coating layer 32 eroded when the pH dropped below 7.2, and the other coating layer 34 eroded when the pH increased above 7.8. Similarly, of the free chlorine sensitive coating layers, one coating layer 36 eroded when the free chlorine was below 1.0 mg/L, and the other coating layer 38 eroded when the free chlorine was above 3.0 mg/L. This allowed for the treatment of pH and free chlorine levels that were either above or below the accepted ranges.

It was observed that when the free chlorine levels dropped below 1.0 mg/L, segment 36/44 dissolved into the water, resulting in an increase of the free chlorine levels to within the accepted range. The other segments 32/40, 34/42 and 38/46 remained intact. The remaining segments were observed to erode and solubilise into the water when their respective parameters were above, or below, their accepted ranges (as appropriate).

EXAMPLE 11

A single spherical tablet 50, such as the one described in relation to FIG. 4, was put into a swimming pool. The tablet 50 generally circulated in the water. Periodically, for the purposes of comparison in this example, the pH level of the pool water was manually tested. It was determined that the pH level of the water was initially within the accepted 'ideal' range of 7.2-7.8.

Tablet 50 contained four regions of the same water treating agent 52 (sodium carbonate), with four respective coating layers 54 (of the same material) surrounding each region of water treating agent. This equated to four doses of sodium carbonate which could be used to increase the pH levels of the water when they dropped below 7.2.

It was observed that when the pH level dropped below 7.2, the outer coating layer 54A eroded. This then exposed the outermost region of sodium carbonate 52A to the water. The next coating layer 54B did not immediately erode, as the water surrounding the coating layer had a higher pH, due to the release of the sodium carbonate 52A.

Thus, coating layer 54B did not erode until the pH of the water again fell below the acceptable range. This occurred four times in total, over a period of seven days, until the final coating layer 54D eroded, exposing the final region of sodium carbonate 52A.

EXAMPLE 12

A capsule, 60, such as the one described in relation to FIG. 5, was put into a swimming pool. The capsule 60 generally circulated in the water or sunk to the bottom of the pool. Periodically, for the purposes of comparison in this example, the pH of the pool water was manually tested. It was determined that the pH levels were initially within the accepted ranges of 7.2-7.8.

Capsule 60 comprised a coating layer 62 that was stable in the pool water when the pH was in the range of 7.2-7.8 (an optimal pH range for swimming pools), and eroded when the pH of the pool water dropped below 7.2. Capsule 60 also had a protective layer 64, which surrounded the sodium carbonate water treating agent 66. Protective layer 64 solubilised when it was exposed to the water, as it was water soluble, which then allowed the sodium carbonate to dissolve into the water. The sodium carbonate was observed to increase the pH of the water, so that it was within the acceptable range, which thus improved the water quality in respect of the pH level.

EXAMPLE 13

A lozenge 70, such as the one described in FIG. 6, was placed into the water of a swimming pool. The lozenge 70 generally circulated in the water or sunk to the bottom of the pool. Periodically, for the purposes of comparison in this example, the pH of the pool water was manually tested. It was determined that the pH levels were initially within the accepted ranges of 7.2-7.8.

Lozenge 70 comprised two segments, 86 and 88. Each segment had a different respective outer coating layer 72, 74, a different respective protective layer 76, 78, and a different respective water treating agents 80, 82. The two coatings 72, 74 were separated by an inert boundary/binding portion 84, which formed the two segments 86, 88 in the lozenge 70. Both segments 86, 88 sensed for deviations of pH levels from the accepted range. Segment 86 sensed and treated the water when pH levels were low (i.e. lower than 7.2) and segment 88 sensed and treated the water when pH levels were high (i.e. higher than 7.8).

It was observed that when the pH level increased above 7.8, coating layer 74 eroded, exposing protective layer 78 to the water. When the protective layer was exposed to the water it too eroded, exposing the water treating agent 82, sodium bisulphate, to the water. This resulted in the pH levels in the water decreasing to within the ideal range.

When the pH level decreased to 7.0, coating layer 72 eroded, exposing protective layer 76 to the water. When the protective layer was exposed to the water it also eroded, exposing the water treating agent 80, sodium carbonate, to the water. This resulted in the pH levels in the water increasing to within the ideal range.

Lozenge 70 provided a simple means to both test and rectify a given parameter which was an indicator of the quality of the water, without having the manually test the water.

EXAMPLE 14

A number of different water treatment products, each sensing and treating a different parameter indicative of water quality, were placed into the cage of a floating dispenser. The floating dispenser was then placed into a domestic swimming pool, and floated on the water surface. The cage of the floating dispenser extended into the water, and pool water permeated through the cage walls, thus surrounding the different water treatment products.

A water treatment product would dissolve into the water once the parameter, which its coating layer sensed, fell outside its ideal range. The coating layer would erode, exposing the water treating agent to the water, thus improving the parameter and water quality.

Whilst a number of specific system embodiments have been described, it should be appreciated that the water treatment products and method may be embodied in many other forms.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the water treatment products and method as disclosed herein.

The invention claimed is:

1. A water treatment product comprising:
   a first pH-sensitive layer comprising a comprising a first substance sensitive to a pH of a body of water to which the water treatment product is exposed, wherein the first pH-sensitive layer is stable at a pH below a first pH but deteriorates at a pH at or above the first pH;
   a second pH-sensitive layer comprising a second substance sensitive to the pH of the body of water to which the water treatment product is exposed, wherein the second pH-sensitive layer is stable at a pH above a second pH but deteriorates at a pH at or below the second pH;
   a first water treating agent configured to be exposed to the body of water when the first pH-sensitive layer deteriorates and to lower the pH of the body of water;
   a second water treating agent configured to be exposed to the body of water when the second pH-sensitive layer deteriorates and to raise the pH of the body of water; and
   wherein the water treatment product comprises an outer surface, wherein the first pH-sensitive layer comprises a first portion of the outer surface, and wherein the second pH-sensitive layer comprises a second portion of the outer surface.

2. The water treatment product as claimed in claim 1 further comprising a protective layer arranged between the first pH-sensitive layer and the first water treating agent or between the second pH-sensitive layer and the second water treating agent.

3. The water treatment product as claimed in claim 2 wherein the protective layer is inert and/or water soluble.

4. The water treatment product as claimed in claim 1 comprising one or more additional water treating agents.

5. The water treatment product as claimed in claim 1 further comprising a boundary layer between the first and second water treating agents.

6. The water treatment product as claimed in claim 4 wherein each of the one or more additional water treating agents has a respective pH-sensitive layer, and wherein the respective pH-sensitive layer for any additional water treating agent may be the same material or a different material as the first pH-sensitive layer or the second pH-sensitive layer.

7. The water treatment product as claimed in claim 6 further comprising for the first water treating agent, the second water treating agent, and each of the one or more additional water treating agents, a protective layer arranged between the water treating agent and its respective pH-sensitive layer, wherein each water treating agent and its respective pH-sensitive layer has a different respective protective layer.

8. The water treatment product as claimed in claim 1 comprising a plurality of pH-sensitive layers dispersed between a plurality of regions of water treating agent.

9. The water treatment product as claimed in claim 1 wherein the first and second water treating agents each individually comprise at least one of: an acid; a base; or a buffer.

10. The water treatment product as claimed in claim 1 that is in the form of a tablet, pellet, ball, granule, particle, capsule, lozenge, sachet, bag or container.

11. The water treatment product as claimed in claim 1 wherein the first or second water treating agent and/or the first or second pH-sensitive layer further comprises a binding or filler material.

12. The water treatment product as claimed in claim 1, wherein the first pH-sensitive layer deteriorates at a pH of 7.9 and the second pH-sensitive layer deteriorates at a pH of 7.1.

13. The water treatment product as claimed in claim 1, wherein the second pH-sensitive layer deteriorates at a pH between 6.6 and 7.1.

14. The water treatment product as claimed in claim 13, wherein the second pH-sensitive layer reversibly swells at or below the second pH and contracts above the second pH.

15. A method of water treatment comprising locating a water treatment product in a body of water, wherein the water treatment product comprises
   a first water treating agent and a first layer of a first substance that is sensitive to a pH of the body of water, wherein the first layer is stable at a pH below a first pH but deteriorates at a pH at or above the first pH, thereby exposing the first water treatment agent to the body of water and lowering the pH of the body of water;
   a second water treating agent and a second layer of a second substance that is sensitive to the pH of the body of water, wherein the second layer is stable at a pH above a second pH but deteriorates at a pH at or below the second pH, thereby exposing the second water treating agent to the body of water and raising the pH of the body of water; and
   wherein the water treatment product comprises an outer surface, wherein the first layer comprises a first portion of the outer surface, and wherein the second layer comprises a second portion of the outer surface.

16. The method as claimed in claim 15 wherein, the method further comprises locating a different water treatment product into the body of water, the different water treatment product comprising a third water treating agent and a third layer of a third substance that is sensitive to the pH of the body of water, wherein the third layer either is stable at a pH above a third pH but deteriorates at a pH at or below the third pH or is stable at a pH below a third pH but deteriorates at a pH at or above the third pH.

17. The method as claimed in claim 15 comprising locating a plurality of water treatment products into the body of water.

18. The method as claimed in claim 15, wherein a quantity of the water treatment product located in the body of water is proportional to a volume of said body of water.

19. A water treatment produce comprising:
   a first pH-sensitive layer comprising a first substance sensitive to a pH of a body of water to which the water treatment product is exposed, wherein the first pH-sensitive layer is stable at a pH below a first pH but deteriorates at a pH at or above the first pH;
   a second pH-sensitive layer comprising a second substance sensitive to the pH of the body of water to which the water treatment product is exposed, wherein the second pH-sensitive layer is stable at a pH above a second pH but deteriorates at a pH at or below the second pH;
   a first water treating agent, surrounded by a first protective layer, wherein the first protective layer is configured such that when the first pH-sensitive layer deteriorates, the first protective layer deteriorates and exposes the first water treating agent to the body of water, whereby the pH of the body of water is lowered;
   a second water treating agent, surrounded by a second protective layer, wherein the second protective layer is configured such that when the second pH-sensitive layer deteriorates, the second protective layer deteriorates and exposes the second water treating agent to the body of water, whereby the pH of the body of water is raised; and
   wherein the water treatment product comprises an outer surface, wherein the first pH-sensitive layer comprises a first portion of the outer surface, and wherein the second pH-sensitive layer comprises a second portion of the outer surface.

* * * * *

UNITED STATES PATENT AND TRADEMARK OFFICE
CERTIFICATE OF CORRECTION

PATENT NO. : 9,988,289 B2
APPLICATION NO. : 14/450329
DATED : June 5, 2018
INVENTOR(S) : Emmanuel Mastio It is certified that error appears in the above-identified patent and that said Letters Patent is hereby corrected as shown below:

On the Title Page

Item (73) the Assignee ZODICAC GROUP AUSTRALIA PTY LIMITED should be corrected to read -- ZODIAC GROUP AUSTRALIA PTY LIMITED --

Signed and Sealed this
Fourteenth Day of August, 2018

Andrei Iancu
*Director of the United States Patent and Trademark Office*